(12) United States Patent
Slotwinski (10) Patent No.: US 7,139,446 B2
(45) Date of Patent: Nov. 21, 2006

(54) COMPACT FIBER OPTIC GEOMETRY FOR A COUNTER-CHIRP FMCW COHERENT LASER RADAR

(75) Inventor: Anthony Slotwinski, Woodbridge, VA (US)

(73) Assignee: Metris USA Inc., Newington, VA (US)

( * ) Notice: Subject to any disclaimer, the term of this patent is extended or adjusted under 35 U.S.C. 154(b) by 0 days.

(21) Appl. No.: 11/354,382

(22) Filed: Feb. 15, 2006

(65) Prior Publication Data
US 2006/0182383 A1  Aug. 17, 2006

Related U.S. Application Data

(60) Provisional application No. 60/653,490, filed on Feb. 17, 2005.

(51) Int. Cl.
*G02B 6/00* (2006.01)
*G01B 9/02* (2006.01)
*G01P 15/08* (2006.01)

(52) U.S. Cl. .................. 385/12; 385/11; 356/493; 356/505; 73/514.26; 73/514.27

(58) Field of Classification Search .......... 385/11, 385/12; 356/453, 493, 496, 505, 369; 73/514.26, 73/514.27; 340/961, 969, 978
See application file for complete search history.

(56) References Cited

U.S. PATENT DOCUMENTS

| | | | |
|---|---|---|---|
| 4,278,351 A | 7/1981 | Breckinridge et al. | |
| 4,340,304 A | 7/1982 | Massie | |
| 4,552,457 A | 11/1985 | Giallorenzi et al. | |
| 4,721,385 A | 1/1988 | Jelalian et al. | |
| 4,824,251 A | 4/1989 | Slotwinski et al. | |
| 4,830,486 A | 5/1989 | Goodwin | |
| 5,106,192 A * | 4/1992 | Tucker et al. | 356/477 |
| 5,294,075 A | 3/1994 | Vertatschitsch et al. | |
| 5,412,474 A * | 5/1995 | Reasenberg et al. | 356/486 |
| 5,534,993 A | 7/1996 | Ball et al. | |
| 7,009,710 B1 * | 3/2006 | Sullivan et al. | 356/487 |
| 2003/0231315 A1 * | 12/2003 | Arbore et al. | 356/477 |

OTHER PUBLICATIONS

Chien, et al., "Distance and velocity-detection interferometer by using a frequency-modulated triangular-modulated laser diode," Applied Optics, Jun. 1, 1995, vol. 34, No. 16, (2853-2855).
Imai et al., "Optical-heterodyne displacement measurement using a frequency ramped laser diode," Optics Communications, Aug. 14, 1990, vol. 18, No. 2 (113-117).

* cited by examiner

*Primary Examiner*—Michelle Connelly-Cushwa
*Assistant Examiner*—Rhonda S. Peace
(74) *Attorney, Agent, or Firm*—Burns & Levinson LLP; Kimberly B. Whitehead (57) ABSTRACT

This disclosure presents a non-contact precision optical device, including methods for measuring distances to an arbitrary target and various configuration geometries, for using polarization maintaining (PM) optical fiber components in a polarization diplexing scheme to construct a version of a dual chirp coherent laser radar that is immune to environmental effects.

19 Claims, 8 Drawing Sheets

//COMPACT FIBER OPTIC GEOMETRY FOR A COUNTER-CHIRP FMCW COHERENT LASER RADAR

CROSS REFERENCE TO RELATED APPLICATIONS

This application claims priority benefit of provisional patent application Ser. No. 60/653,490 filed Feb. 17, 2005, the contents of which are incorporated herein by reference.

BACKGROUND OF THE INVENTION

1. Field of the Invention

The invention is a non-contact precision optical sensor for measuring distances to objects (targets) using coherent optical detection and two laser sources in a counter-chirp frequency modulated (FM) laser radar configuration 2. Description of the Related Art Many optical systems exist which measure a distance to a target. Such systems utilize an open beam propagated through free space between the laser source and the target. However, when the target location is such that limited free space is available for beam propagation, such known systems are of limited use. Thus, known systems may be able to perform distance measurements, but the open beam optical sensor head prevents application in limited access areas and tight places. For example, precision measurement of dimensions inside a chassis cannot easily by accomplished with known open beam systems. While it is known to transfer light through optical fibers, precision is compromised due to the environmental effects on the fiber itself. These environmental effects change the optical path length and the polarization of the light in the fiber, adversely affecting measurement precision.

A known optical measurement system is disclosed in U.S. Pat. No. 4,340,304 to Massie. Massie discloses an interferometic method and system for detecting defects in the surface of a mirror. Massie discloses a polarizing beamsplitter, a quarter-wave plate, and a target (test mirror). However, Massie is an open beam system and thus incapable of accessing limited space targets.

The advantages of coherent optical detection are fundamental. The information carrying capacity of the optical beam reflected from the target is orders of magnitude greater than other available systems. Simply put, the use of optical heterodyne detection allows for optical radiation detection at the quantum noise level. As such, coherent optical systems provide greater range, accuracy, and reliability than many known prior art measurement systems. Coherent optical systems can also provide a greater scanning range, a greater working depth of field, and may also operate in ambient light conditions. Furthermore, in a coherent system the target beam is not required to dwell upon the target for very long in order to obtain sufficient information about the characteristics of that target location.

Briefly, optical heterodyne detection provides a source light beam which is directed to a target and reflected therefrom. The return light beam is then mixed with a local oscillator light beam on a photo detector to provide optical interference patterns which may be processed to provide detailed information about the target. Optical heterodyne techniques take advantage of the source and reflected light beam reciprocity. For example, these light beams are substantially the same wavelength and are directed over the same optical axis. This provides an improved signal-to-noise ratio (SNR) and heightened sensitivity. The SNR is sufficiently high so that a small receiving aperture may be used, in contrast to known direct detection systems. A small receiver aperture may be envisioned as a very small lens capable of being inserted into limited access areas. Since a small receiver aperture can still provide detailed information about the target, the optical components of a coherent system may be made very small and provide related increases in scanning speed and accuracy. For example a coherent optical system using a one-half inch aperture can obtain more information about a target than a four inch aperture used in a direct optical detection system.

Key technologies of Al Ga As laser diodes and fiber optical components are currently enjoying a burst of development for applications in telecommunications. Because of these efforts, recent improvements in the quality of injection laser diodes provide the coherence length and wavelength turning range needed for precision, coherent optical measurement system. The small size of the injection laser diode and high-technology integrated optical assemblies make possible the development of a new family of small, low cost, precise distance measuring devices which are orders of magnitudes more accurate and more reliable than their more conventional counterparts.

High precision, non-contact measurement devices, having a resolution on the order of 25 to 250 nm, are needed to inspect high precision machined components. In contrast, measurement of large objects (e.g., automobiles, airplanes, etc.) may be carried out using coordinate measurement machines (CMMs) and laser trackers. Such precision devices have a resolution in the 1 to 10 micron range.

Laser radar devices for precision measurement applications within this range have been described by Goodwin, U.S. Pat. No. 4,830,486, and Slotwinski and Kenyon, U.S. Pat. No. 4,824,251. Goodwin, for example, discloses frequency modulating a laser, splitting the beam into reference and target components, recombining the beams to create a beat signal (heterodyning) and determining properties of the beat wave by analyzing a pattern of fringes obtained on a detector. Both patents describe fiber optic embodiments of the method.

The principle of operation of an FM heterodyne interferometer for making high precision distance measurements is described in Chien, et al., "Distance and velocity-detection interferometer by using a frequency-modulated triangular-modulated laser diode," Applied Optics, 1 Jun. 1995, vol. 34, no. 16, (2853–2855), and Imai et al., "Optical-heterodyne displacement measurement using a frequency ramped laser diode," Optics Communications, 15 Aug. 1990, vol. 18, no. 2, (113–117). These and similar instruments work well for measuring the displacement of ideal reflecting surfaces such as mirrors. The devices which have been demonstrated that are made in accord with the teachings of Chien et al., and Imai et al., and are slow, taking several seconds to integrate data to obtain a usable fringe image. This overly lengthy time for analysis results in these devices being very sensitive to alignment and vibration. When applied to the measurement of position of non-ideal surfaces such as anodized aluminum or the flanks of a tread, which are typically at a 30 degree angle of incidence to the interferometer beam, the signal-to-noise ratio becomes too small to make a reliable high resolution measurement.

As indicated above, the prior art shows that a number of frequency-modulated heterodyne interferometric systems have been experimentally developed for high precision measurement.

The existing art in precision FM laser radar incorporates a single chirp laser source and a polarization maintaining fiber optic geometry with separate local oscillator (LO) and signal paths. The present invention incorporates two major improvements over the art. First, a counter-chirp configuration provides for a much greater insensitivity to vibration induced range errors by providing for a more accurate Doppler correction. Second, by combining the LO and signal paths for two lasers into a single fiber, the fiber optic circuit is both less complicated and less expensive due to fewer components and completely immune to error caused by changes in the LO and signal path lengths due to environmental factors such as temperature changes. For example, it is envisioned that the need for this technology resides in the manufacturing industry (e.g., factories) in which both background vibrations and changing environmental conditions exist. This combination of LO and signal paths provides the additional benefit that the sensor head portion of the unit can be placed in areas of restricted volume since it can be remoted arbitrarily far from the rest of the unit.

Thus, what is needed is a practical optical precision measurement system capable of great accuracy, rapid measurement time, access to tight spaces, flexibility, and reliability. The present invention discloses such a system.

SUMMARY OF THE INVENTION

The present invention relates to an optical distance measuring apparatus which includes a first laser source for producing a first light beam, a second laser source for producing a second light beam, where waveforms for the first and second light beams are 180 degrees out of phase with each other so that the first light beam is chirped up as the second light beam is chirped down and vice versa, a first optical element for combining the first and second light beams into a combined light beam, and for splitting any returning portion of the combined light beam into third and fourth light beams, a first detector for receiving the third light beam, and a second detector for receiving the fourth light beam.

In another embodiment, a method for determining a range of a distant object is envisaged, including producing a first light beam from a first laser source and a second light beam from a second source, where waveforms for the first and second light beams are 180 degrees out of phase with each other so that the first light beam is chirped up as the second light beam is chirped down and vice versa, directing light emitted from the sources toward an object, receiving a reflected LO path and target-reflected signal path for each source, detecting the LO path and signal path for each source, and heterodyning the paths for each source to generate a beat frequency, which frequency is proportional to the range difference between the two paths, and where the path length difference between the LO path and corresponding signal path is equal to the distance to be measured.

In somewhat less general terms the invention is a diplex dual-chirp laser apparatus for precision absolute distance measurement comprising a first frequency-modulated laser that emits a first coherent light beam having a first emission frequency modulated by a first chirping modulation signal and a second frequency-modulated laser that emits a second coherent light beam having a second emission frequency modulated by a second chirping modulation signal. The second chirping modulation signal is established to chirp with a constant phase difference from the first chirping modulation signal, preferably a 180 degree phase difference. The invention further comprises a first fiber optic coupler optically connected to the first frequency-modulated laser wherein the first coherent light beam is split into two nominally 50 percent fractions and a second fiber optic coupler optically connected to the second frequency-modulated laser, wherein the second coherent light beam is split into two nominally 50 percent fractions.

Additionally there is a linear polarization-maintaining fiber having a beam entry end and a beam exit end and comprising a first axis and a second axis, each axis being capable of independently transmitting along the fiber an independent polarized coherent light beam having a linear polarization orthogonal to the polarization of the other coherent light beam. A linear polarization splitter is optically connected to the first fiber optic coupler, the second fiber optic coupler, and the beam entry end of the linear polarization-maintaining fiber, whereby the coherent light beam emitted by the first frequency-modulated laser is polarized for one linear polarization and transmitted as a first linear polarized laser light beam and the coherent light beam emitted by the second frequency-modulated laser is polarized for a second linear polarization and transmitted as a second linear polarized light beam, said first and second linear polarizations being orthogonal to one another.

There is also an interface at the beam exit end of the linear polarization-maintaining fiber, whereby a fraction of the transmitted light from each of the first coherent light beam and the second coherent light beam is reflected back toward the linear polarization splitter and thence transmitted respectively into the first fiber optic coupler and the second fiber optic coupler and whereby a complementary fraction of the transmitted light is transmitted to the target and returned to the interface from the target; a first optical detector optically connected to the first fiber optic coupler; whereby a first interference is established between the reflected fraction of the transmitted light from the first coherent light beam and the return of the first coherent light beam from the target and whereby the first optical detector detects a first beat frequency from the first interference; a second optical detector optically connected to the second fiber optic coupler; whereby a second interference is established between the reflected fraction of the transmitted light from the second coherent light beam and the return of the second coherent light beam from the target and whereby the second optical detector detects a second beat frequency from the second interference. Thereafter the beat frequency signal is sent to digital signal processing apparatus configured to produce a first beat frequency measurement and a second beat frequency measurement. In the most preferred embodiment a first calibrated reference arm standard is optically connected to the first fiber optic coupler and receives one of the two nominal 50 percent fractions of the first coherent light beam and further producing a first reference arm output; a second calibrated reference arm standard is optically connected to the second fiber optic coupler and receives one of the two nominal 50 percent fractions of the second coherent light beam and further producing a second reference arm output. Computer apparatus combines the first beat frequency measurement with the first reference arm output to produce a first absolute distance measurement, and further combines the second beat frequency measurement with the second reference arm output to produce a second absolute distance measurement. The computer apparatus further combines the first absolute distance measurement with the second absolute distance measurement to produce a composite absolute distance measurement, wherein uncertainty in the composite absolute distance measurement is substantially reduced.

Optionally first calibrated reference arm standard and the second calibrated reference arm standard are fiber optic interferometers. Optionally as well, each fiber optic interferometer comprises an input fiber optic coupler optically connected to the fiber optic coupler, said input fiber optic coupler capable of splitting incoming light into a two parts; two fiber optic fibers of different optical path lengths having a calibrated optical path length difference and each receiving a part of the incoming light from the input fiber optic coupler; an output fiber optic coupler, whereby the two parts of the light from the two fiber optic fibers are recombined, whereby an interference and a consequent beat frequency is established; a detector that detects the beat frequency. The results proceed to digital signal processing apparatus configured to produce a beat frequency measurement for each reference arm, and said beat frequency measurement for each reference arm comprises the reference arm output for the reference arm standard.

Exemplary methods and systems according to this invention are described in greater detail below.

BRIEF DESCRIPTION OF THE DRAWINGS

For proper understanding of the invention, reference should be made to the accompanying drawings, wherein.

DETAILED DESCRIPTION OF THE PREFERRED EMBODIMENTS

Before the present invention is described, it is understood that this disclosure is not limited to the particular devices, methodology and components described as these may vary. It is also to be understood that the terminology used herein is for the purpose of describing particular embodiments only, and is not intended to limit the scope of the present invention which will be limited only by the appended claims.

It should be further understood that as used herein and in the independent claims, the singular forms "a," "an," and "the" include plural reference unless the context clearly dictates otherwise. Thus for example, reference to "an isolator" includes a plurality of such isolators, reference to a "lensing means" is a reference to one or more lenses and equivalents thereof known to those skilled in the art. Unless defined otherwise, all technical and scientific terms used herein have the same meanings as commonly understood by one of ordinary skill in the art to which this invention belongs.

As used herein, "coherent radiation," including grammatical variations thereof, means radiation in which the phase relationship between any two points in the radiation field has a constant difference, or is exactly the same in either the spatial or the temporal mode throughout the duration of the radiation. For example, a laser is a device which artificially generates coherent radiation in the form of light within a narrow range of wavelengths.

As used herein, "engaged with," including grammatical variations thereof, means optically coupled or fiber optic linked by a fiber optic wire or optical wave guide fiber. In a related aspect, a fiber optic wire consists of thin filaments of glass or plastic with a core and a cladding which is capable of carrying information in the form of light.

As used herein, "corresponding," including grammatical variations thereof, means having or participating in the same relationship (as kind, degree, position, or function) especially with regard to the same or like wholes (as geometric configuration or sets).

As used herein, "common," including grammatical variations thereof, means belonging to or shared by two or more components.

In coherent, or FM laser radar that uses a diode laser as its source, the frequency of the laser is modulated directly by modulating the laser's injection current. Typically, the frequency is modulated with a waveform, with the objective of producing linear modulation. This type of modulation is often referred to as a chirp. The two chirping modulation input signals or waveforms that are sent to the two lasers to modulate their output wavelength are not identical. Each laser is unique in how it tunes and therefore a unique waveform must be generated for each laser. Both the waveform shape and amplitude vary from laser to laser. The important thing is to generate an input injection current waveform that produces a linear chirp of a given change in wavelength over the duration of the chirp. Each input injection current waveform is adjusted such that the laser outputs are identical. In the most common form of modulation for this type of application, the injector current modulation signals are uniquely shaped for each laser and are distorted sawtooths waves intended to produce a linear sawtooth frequency modulation envelope for the output of the laser. The injection current modulation is custom shaped so that the output modulation of each lasers is sawtooths and so that the two are as identical as is practicable.

The laser output frequency can be expressed as a function of time in the following manner:

$$f(t)=f_0+(\Delta f/\Delta t)t \tag{1}$$

where $f_0$ is the center frequency of the laser. The modulated beam is focused at the target, where it is scattered and collected by the receiver optics after round trip transit time t. The distance to the target, R, is calculated using the relationship:

$$\tau=2R/c \tag{2}$$

where c is the velocity of light.

The key to FM laser radar is coherent detection. Laser beams can be characterized by both spatial and temporal coherence. For FM radar, temporal coherence is important, and is related to the finite bandwidth of the laser source. Temporal coherence specifies the time interval over which one can reasonably predict the phase of the light wave at a given point in space. This is essential to the concept of optical mixing. Coherent light waves, when combined correctly on an optical detector, produce a beat frequency equal to the difference in the optical frequency (and hence phase) of the incident waves. (As in electronic mixers, a sum frequency is also produced but not detected since optical detectors cannot respond to signals in the optical range of approximately 1015 Hz.)

In an FM laser radar device, a portion of the transmitted beam is split from the incident light wave and forms the local oscillator, which is then mixed with the returned energy. In a coherent laser radar the beat frequency produced will be equal to:

$$\text{Beat frequency} = f(t) - f(t+\tau) = (\Delta f/\Delta t)\tau \quad (3)$$

The beat frequency is measured electronically and used to calculate the distance to the target R:

$$R = c \ast \text{beat frequency}/(2(\Delta f/\Delta t)) \quad (4)$$

In early FM devices, the accuracy of range measurement was limited by the linearity of the frequency modulation over the counting interval. For example, if the target is one meter distant, linearity of one part per thousand is necessary to ensure 1 mm accuracy.

In one embodiment of the present invention, laser radars enable a high degree of linearity. In addition, these techniques as disclosed can detect and compensate for real time variances from linearity. This enables range measurement with a single digit micron precision.

FM lasers are largely immune to ambient light conditions and changes in surface reflectivity because FM laser radars rely only on beat frequency, which is not dependent upon signal amplitude, to calculate range. This enables the FM Coherent system to make reliable measurements with as little as one picowatt of returned laser energy. This corresponds to a nine order-of-magnitude dynamic range of sensitivity.

Figure 1:
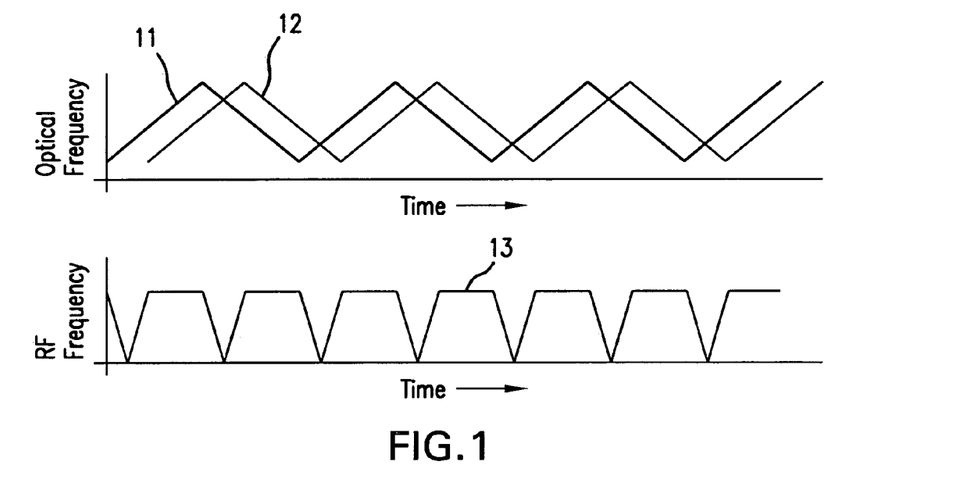
FIG. 1 shows the laser optical frequency and the heterodyned radio frequency (RF) signal of coherent laser radar.

FIG. 1 shows graphically the basic prior art relative distance measurement. The linear frequency modulation, or "chirp," of the local oscillator, produces the up and down optical frequency sweep 11 of the transmitted laser beam. The return or received range signal 12 is time lagged with respect to the outgoing beam. Combining these two light signals produces a corresponding interference or "beat" frequency signal 13. Range is proportional to the maximum RF interference frequency. The laser base frequency is approximately 200 terahertz. The "beat" frequency is in the 1 MHz range. The up and down chirping can provide target velocity information. If the surface being measured is moving relative to the laser light source, the beat frequencies corresponding to laser upsweeps will be different from the beat frequencies corresponding to the downsweeps, due to Doppler frequency shifting. Measuring the frequency difference between portions of the return signals enables a determination of velocity to be made.

While processing up and down chirps allows for detecting separately the target's range and velocity, the range data will be compromised if there is any intrachirp velocity variation such as can occur if the target is vibrating.

In extant single laser configurations, coherent systems use a 1550 nm laser diode source, which is frequency modulated by varying its injection current. This type of laser is selected for its commercial availability, tunability and for the technical maturity of the associated fiber optic components available at this wavelength.

Light back-scattering from a moving surface will be frequency, or Doppler, shifted based on the following expression:

$$F_d = 2v \ast \cos(\alpha)/\lambda \quad (5)$$

where
$F_d$ = Frequency shift
$v$ = Surface velocity
$\alpha$ = Angle between the velocity vector and the light beam direction
$\lambda$ = Wavelength of the light In the case of a surface velocity component pointed in the direction of the system, this frequency shift will be added to the beat frequency generated by the distance to the target during the laser upsweep and subtracted from the beat frequency during laser downsweep for single laser systems. To obtain an accurate range measurement and to determine the surface velocity, two successive sweeps must be processed to find the average beat frequency and the difference between beat frequencies. The laser waveform generation electronics and system digital signal processing (DSP) electronics currently used in existing systems are capable of tuning diode laser source at a signal sweep rate of 1000 measurements per second. Therefore, this processing for single laser systems lowers the maximum measurement rate to 500 measurements per second. In addition, the range data can be compromised if there is any intrachirp velocity variation such as can occur of the target is vibrating.

By using two laser sources in a counter-chirp configuration, range measurement errors due to target vibrations are greatly reduced, allowing for accurate measurements in, for example, vibrationally noisy environments such as those found in many factories.

A second advantage of the counter-chirp geometry is an effective doubling of the measurement rate from 500 measurements per second to 1000 measurements per second, because the up and down sweeps are simultaneous rather than sequential.

In a preferred embodiment, a method to compensate for velocity induced range error is to employ two laser sources in a counter-chirp configuration. In a related aspect, one laser is chirped up then down while the other is simultaneously chirped down then up, such that effectively, each waveform generated thereby is 180 degrees out of phase. The resulting signals can then be processed to provide a much greater immunity to velocity errors (e.g., but not limited to, vibration induced errors).

The invention will now be described in greater detail by reference to the following non-limiting examples. The following examples are intended to illustrate but not limit the invention.

EXAMPLE 1

Compact Counter-Chirp Geometry

Figure 2:
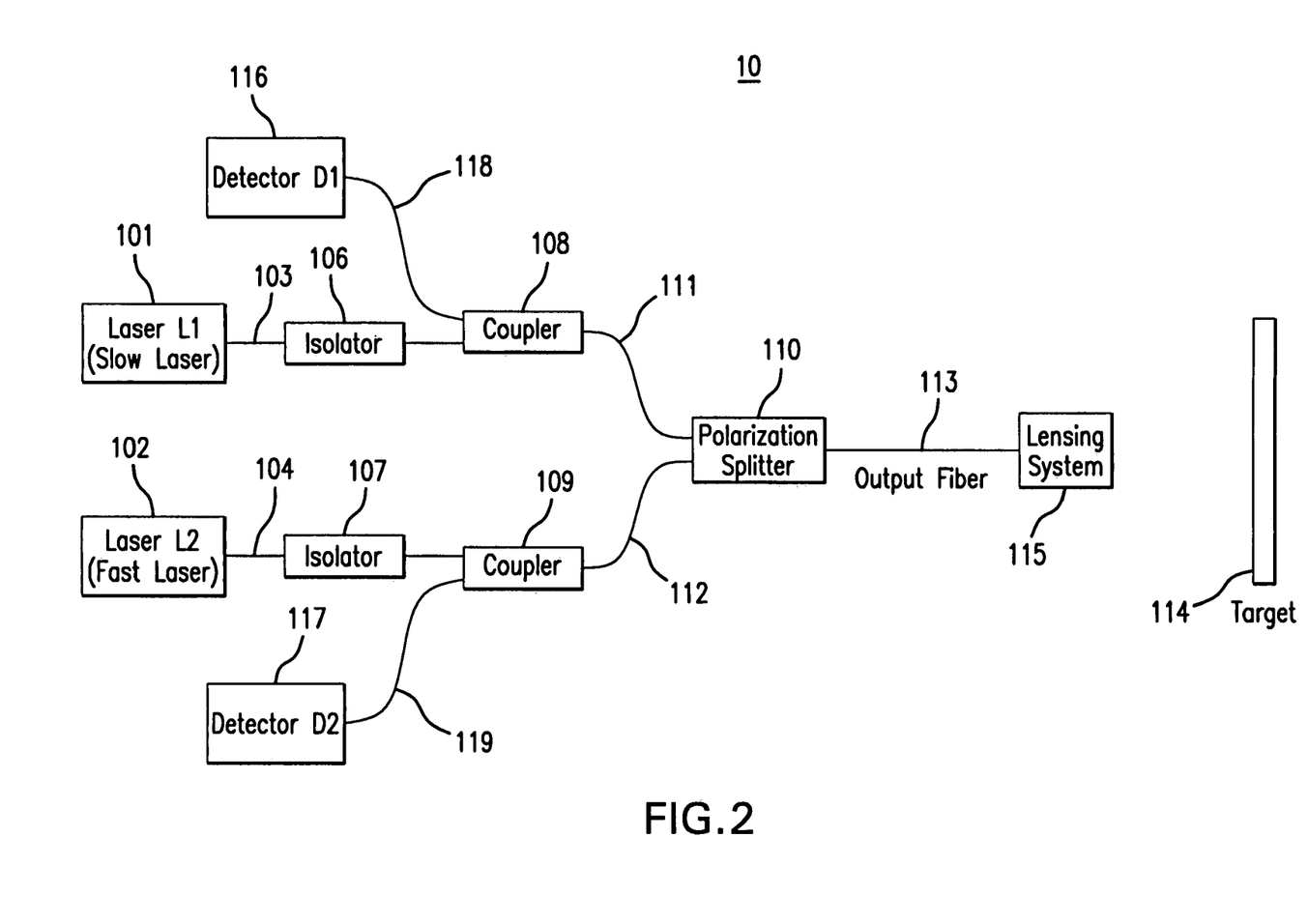
FIG. 2 shows compact counter-chirp laser radar geometry.

This disclosure presents a technique for using polarization maintaining (PM) optical fiber components in a polarization diplexing scheme to construct a version of the dual chirp coherent laser radar that is totally immune to environmental effects. FIG. 2 illustrates such a laser radar optical configuration, 10. The laser light is generated by two PM fiber pigtailed laser diodes (101, 102). In a related aspect, laser light may be generated by a fiber laser or solid-state laser source. The light from laser L1, 101, designated the slow laser, is aligned with the corresponding slow axis of the PM fiber, 103, The light from laser L2, 102, designated the fast laser, is aligned with the corresponding fast axis of the PM fiber, 104. The light from each laser passes through a corresponding fiber optic optional isolator (106, 107) to prevent back-reflected light from disrupting the lasers' tuning characteristics. In a related aspect, the isolator may be a fiber pigtailed or bulk optical (i.e., open beam) device. The light from each laser is received by two fiber optic couplers (108, 109) each with a nominal 50% coupling ratio. In a related aspect, such couplers may be any beamsplitting device, including, but not limited to, bulk optical cube beamsplitters as well as partially mirrored plates and membranes. In a related aspect, beamsplitting devices, in which the state of polarization of the light determines the coupling direction, include, but are not limited to, bulk optical cube beamsplitters.

Light from both lasers is then combined into a singer fiber by means of a fiber optical polarization splitter, 110. The polarization splitter, 110, couples the light in the slow axis of one input fiber, 111, and the light in the fast axis of the other input fiber, 112, into the corresponding axis of a single output fiber, 113. The light then travels down this fiber and can be transported to the site of the measurement with great geometric flexibility. At the end of the fiber, 113, the interface between the fiber, 113, and the medium through which the measurement is to be take, a fraction of the light (4% if the medium is air) is reflected back into the fiber, 113. The light from laser L1, 101, which was in the slow axis, is reflected back into the slow axis and the light from laser L2, 102, which was in the fast axis, is reflected back into the fast axis. These reflected light paths become the LO paths for each laser radar. The light that emerges from the fiber, 113, reflects off the target, 114, and returns to the fiber, 113, defines the signal path for each laser radar. Typically, a lensing system, 115, is used to focus the light in the measurement region of interest in order to maximize the amount of light returned to the optical fiber, 113. This lens, 115, can be a fixed focus system or an adjustable focus system depending upon the optical depth of field needed. In addition, after emerging from the lensing system, the light can be directed to different parts of the target by means of a scanning mirror to provide two- or three-dimensional measurements. In a related aspect, scanning mirror devices include, but are not limited to, galvanometric driven mirrors, piezoelectric actuators, coil drivers and gimbal mounted mirrors.

Upon emerging from the output fiber, 113, the light from laser L1, 101, is linearly polarized in one direction and the light from laser L2, 102, is linearly polarized in a direction orthogonal to the L1 (101) light. Upon reflection from a target, 114, the light from each laser is reinjected back into the fiber, 113, in its original axis. The L1 (101) light in both the LO and signal path travels back through the polarization splitter, 110, and the L1 coupler, 108, to a corresponding optical detector, 116, where the light from the two paths mix to form the RF signal that is proportional to the range difference between the two paths. In a similar manner, the L2 (102) light from the LO and signal paths travels to the L2 (102) detector, 117. Since the light from the two lasers (101, 102) are always in orthogonal polarized states, they do not interfere with each other and the two resulting laser radar signals appear only at their own corresponding detectors (116, 117).

Since the LO paths and the signal paths travel in common fibers (i.e., 113, 111, 112, 118, and 119), the interference can be considered to be occurring at the interface that creates the LO signal. This means that the path length difference between the LO path and its respective signal path is equal to the distance to be measured. Therefore, optical path changes in the fiber due to environmental effects such as temperature changes will have no effect on the measured signal. The length of fiber from the polarization splitter, 110, to the output at the lensing system, 115, can therefore be made arbitrarily long without degrading the measurement. This allows placement of a sensor head (the output fiber, 113, the lensing system, 115, and any scanning mechanism) in areas of restricted volume while the remainder of the system including the rest of the optics, the electronics and power supplies are located in a more accessible location. In addition, the all fiber optic construction provides for a ruggedized unit that cannot be misaligned or degraded by airborne containments unlike bulk optical assemblies.

Figure 3:
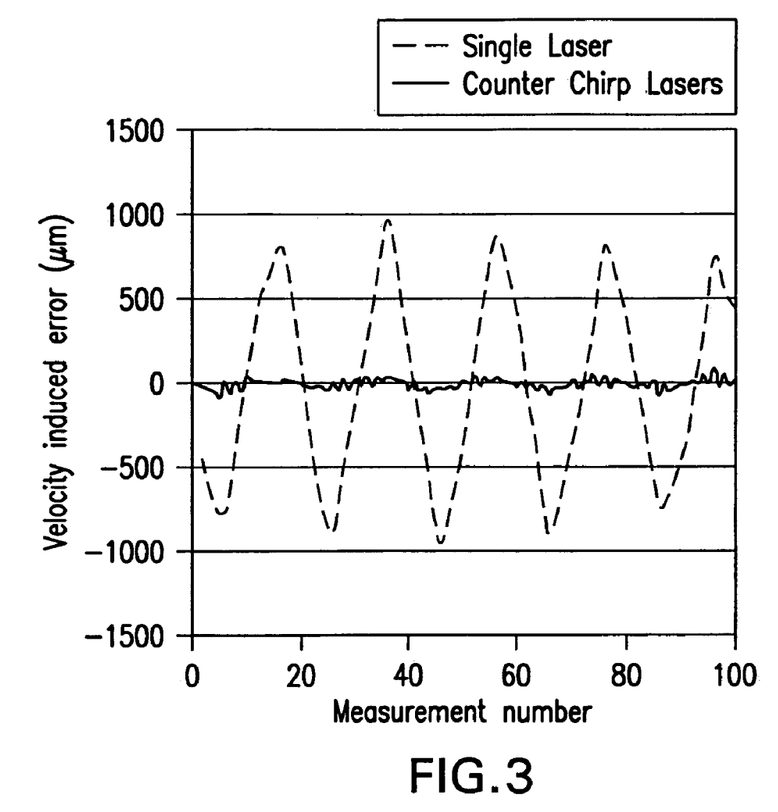
FIG. 3 compares the error range caused by a vibrating target for a single laser system and a counter-chirped, dual laser configuration.

As stated above, by using two laser sources in a counter-chirp configuration, vibrationally induced range measurement errors are reduced. As an example, in FIG. 3, where the range error caused by a target vibrating at 50 Hz at an amplitude of 10 microns peak-to-peak for both a single laser system and for a system employing a counter-chirp, dual laser configuration is shown. The reduction in velocity induced error is shown to be by a factor of about twenty.

Figure 4:
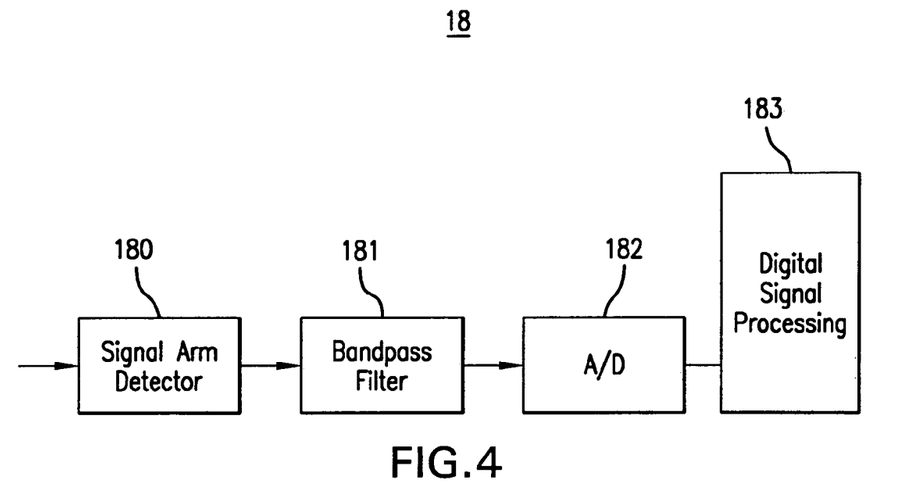
FIG. 4 illustrates coherent laser signal processing for counter-chirped, dual laser configuration.

FIG. 4 illustrates processing of the optical signal using DSP circuitry (18). The optical signal from the reflected signal path is converted into an electrical signal by means of a photodiode detector circuit (180, equivalent to detector D1 (116) and detector D2 (117) in FIG. 2). In one embodiment, a PIN photodiode Field Effect Transistor (pinFET) photodetector module is used. This detection process produces the beat frequency to be measured. The beat frequency signal is bandpass filtered (181) to eliminate noise outside of the frequency band of interest and then digitized by means of an analog-to-digital (A/D) converter (182). A Fast Fourier Transform (FFT) algorithm is then used by the DSP circuitry (183) to determine the exact frequency of the range signal. Further processing, typically done at a higher level than the DSP electronics, optionally on the control computer, converts each of the measured frequencies into a distance measurement. The two distance measurements are then averaged to eliminate the Doppler range error and come up with a composite distance measurement.

EXAMPLE 2

Compact Counter-Chirp Geometry, Including Reference Arm Standard

Figure 5:
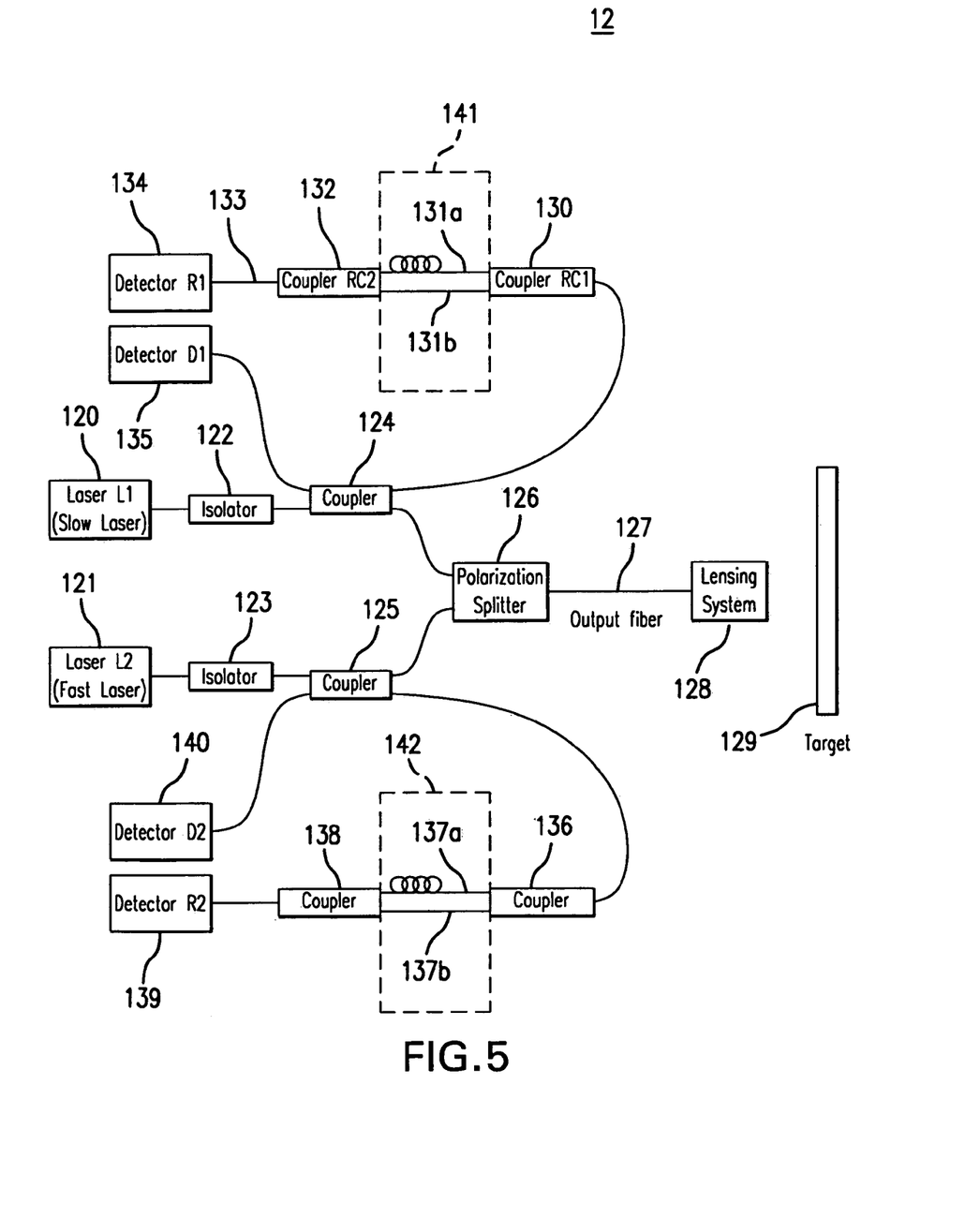
FIG. 5 shows fiber geometry with reference arm interferometers.

For precision measurements it is necessary to include a reference arm standard both for absolute ranging accuracy and to help linearize the lasers' chirp waveforms. This reference standard can take the form of a fiber optic interferometer in a Mach Zehnder configuration (e.g., see U.S. Pat. No. 4,552,457). Alternatively, a Michelson interferometer configuration may also be used (e.g., see U.S. Pat. No. 4,278,351). FIG. 5 illustrates the basic geometry, 12, with reference arm standards for each laser (120, 121). In this geometry, 12, the light from laser L1, 120, after passing through the isolator, 122, is received by a fiber coupler, 124. This coupler, 124, has a nominal 50/50 splitting ratio. Other splitting ratios are possible but are less desirable in terms of system performance. The light energy that is directed to the target is split into the signal and LO paths and detected as described in Example 1. The remainder of the light energy is directed to the reference arm standard that comprises an input fiber optic coupler, RC1, 130, which splits the light into two fiber paths, 131a, 131b, and an output fiber coupler, RC2, 132, which recombines the light into a single fiber, 133. The two paths of fiber between the two couplers (130, 132) are mismatched in length by several meters such that a laser radar signal is detected on the detector, R1, 134. In one aspect, the mismatch between the two fibers of the reference interferometer needs to be long enough to provide a signal useful in the linearization of a laser's waveform but short enough so that coherent noise does not degrade the signal. In one embodiment, as the range path requires light to travel to the target and back from the target, an optical path mismatch would require about a two-fold difference in length. For example, where the range signal path is equivalent to 4 meters, the optical path length mismatch is about 8 meters. In another related aspect, the mismatched lengths differ by about 2.0 meters, 2.5 meters, 3.0 meters, 3.5 meters, 4.0 meters, 4.5 meters, 5.0 meters, 5.5 meters, and 6.0 meters. In one embodiment, the fiber length difference is about 5.4 meters.

Typically, the Mach Zehnder interferometer formed by the two couplers (130, 132) and the fibers between them, 131*a*, 131*b*, are, optionally, kept in a temperature-controlled container, 141, to prevent the fiber lengths from changing. The container dimensions/configuration may be made to conform to the design choice of one skilled in the art. In one embodiment, the container comprises an inner compartment consisting essentially of copper, further comprising fiber optic elements. In a related aspect, the compartment uses thermal electric coolers and a thermal control circuit to maintain a constant temperature. Further, the inner compartment may be surrounded by insulation, the inner compartment in turn is contained in a second temperature controlled chamber. This second chamber may be comprised of aluminum and also surrounded by insulation forming a double oven structure. In one embodiment, the temperature is set to the center of the normal operating range for this type of instrument. In a related aspect, the range is between about 5 degrees C. to about 40 degrees C. In one embodiment, the temperature is about 25 degrees C. If the difference in fiber lengths is calibrated, the reference interferometer (i.e., 130, 131*a*, 131*b*, 132) can serve as an absolute length standard for the laser radar system as well as provide a signal useful in the linearization of the laser L1's (120) waveform. In a similar manner, a corresponding reference interferometer (i.e., 126, 137*a*, 137*b*, 138, to include, optionally, a temperature-controlled container, 142) serves as an absolute length standard and detector R2, 139, provides a signal useful in the linearization of laser L2's (121) waveform.

Figure 6:
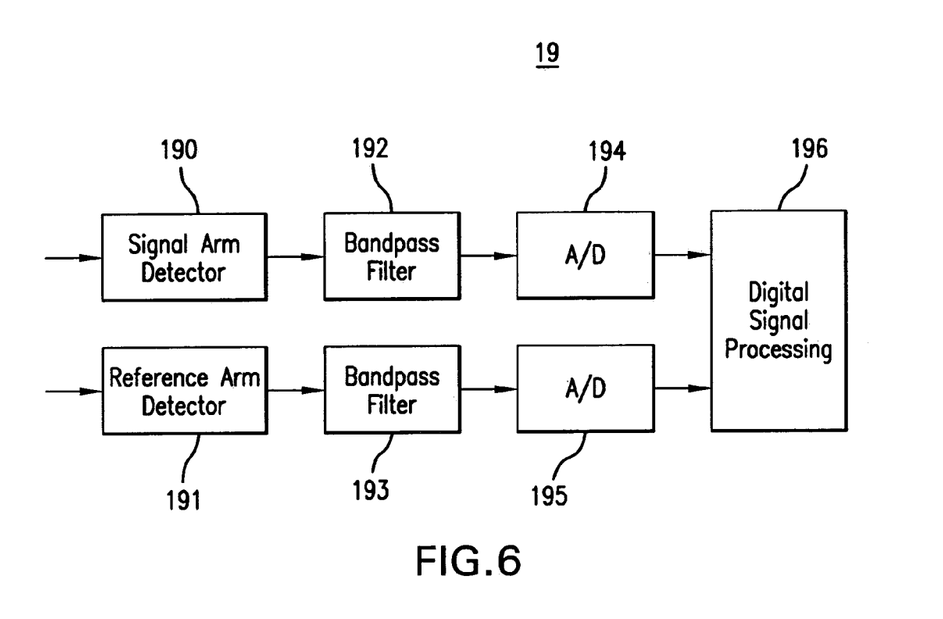
FIG. 6 illustrates coherent laser signal processing for counter-chirped, dual laser configuration with reference arm interferometers.

Processing the signals is illustrated in FIG. 6 (19). Similar to the flow of FIG. 3, the optical signal from the signal path is converted into an electrical signal by means of a photodiode detector circuit (190, equivalent to detectors 135 and 140 in FIG. 5). Again, this detection process produces the beat frequency to be measured. Further, as above, the beat frequency signal is bandpass filtered (192) to eliminate noise outside of the frequency band of interest and then digitized by means of an A/D converter (194). However, now the reference arm's signal is conditioned in the same manner, i.e., via detector 191 (equivalent to detector R1 (134) and detector R2 (139) in FIG. 5), bandpass filter, 193, and A/D converter, 195, where the DSP circuitry (196) then uses the reference arm signal to eliminate residual non-linearities in the signal path optical signal. An FFT algorithm is again used to determine the exact frequency of the range signal. Further processing, typically done at a higher level than the DSP electronics, optionally on the control computer, converts each of the measured frequencies into a distance measurement. Two distance measurements are then averaged to eliminate the Doppler range error and come up with a composite distance measurement.

EXAMPLE 3

Compact Counter-Chirp Alternative Geometry, Including Reference Arm Standard

Figure 7:
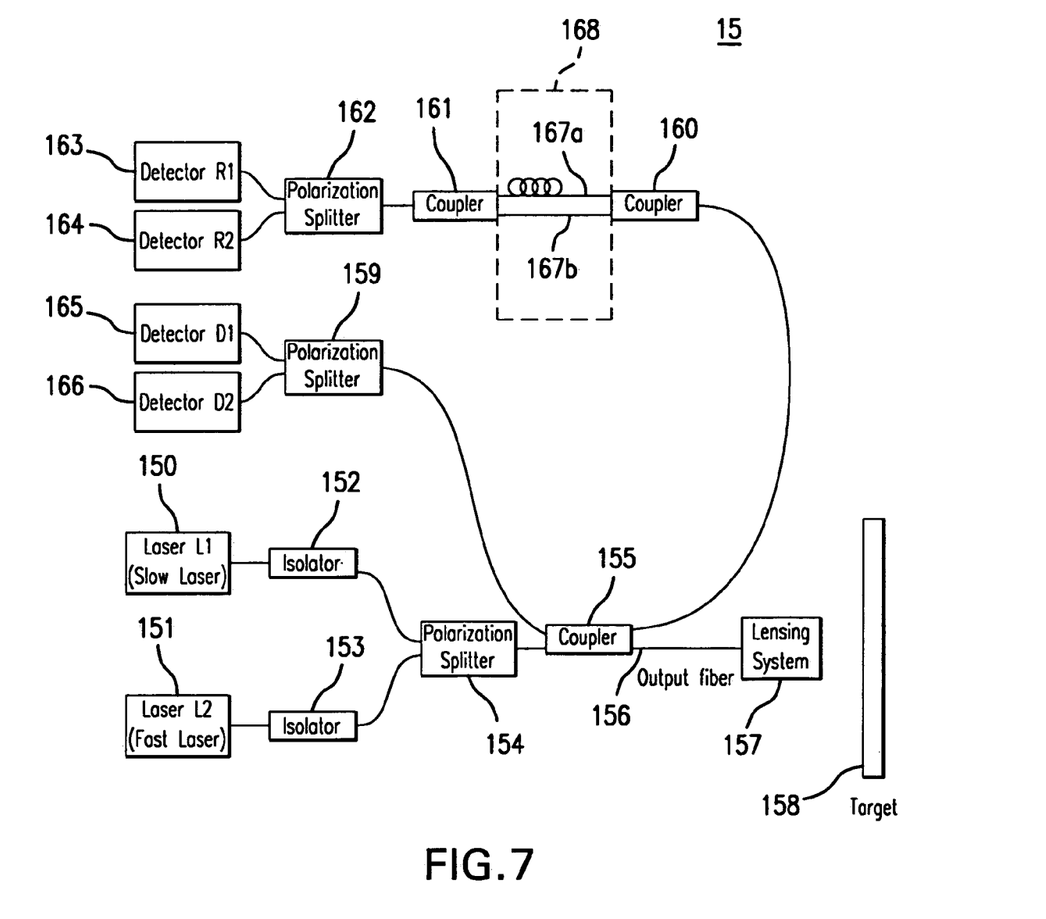
FIG. 7 shows alternate fiber geometry to that illustrated in FIG. 5.

In an alternate fiber geometry, 15, the invention can be configured as illustrated in FIG. 7. In this configuration, 15, the light from lasers L1, 150, and L2, 151, after passing through their corresponding isolators (152, 153), are combined by a polarization splitter, 154. The light from the two lasers (150, 151) are received by a fiber optic coupler, 155, such that their orthogonal polarizations are preserved. The light energy that is directed to the target, 158, is split into the signal and the LO paths as described in Example 1 and is directed to the detectors D1, 165, and D2, 166, by means of the passing through the coupler, 155, again. A second polarization splitter, 159, directs the light in the LO and signal path from laser L1, 150, to detector D1, 165 and the light in the LO and signal path from laser L2, 151, to detector D2, 166. In a similar manner, light from the two lasers (150, 151) is injected into the reference interferometer by means of the coupler, 155 (i.e., 160, 161, having same configuration as the reference arm couplers in FIG. 5, including, optionally, that the fibers between them (167*a*, 167*b*) are kept in a temperature-controlled container, 168, to prevent the fiber lengths from changing). In a related aspect, mismatched fiber lengths between 160 and 161 differ by about 2.0 meters, 2.5 meters, 3.0 meters, 3.5 meters, 4.0 meters, 4.5 meters, 5.0 meters, 5.5 meters, and 6.0 meters. In one embodiment, the fiber length difference is about 5.4 meters.

The output of the reference interferometer (160, 161) passes through a third polarization splitter, 162, which directs the laser L1's (150) reference arm signal to detector R1, 163, and laser L2's (151) signal to detector R2, 164. Again, DSP circuitry uses the reference arm signal to eliminate residual non-linearities in the signal path optical signal and an FFT algorithm is used to determine the exact frequency of the range signal. As before, further processing, typically done at a higher level than the DSP electronics, optionally on the control computer, converts each of the measured frequencies into a distance measurement. The two distance measurements are then averaged to eliminate the Doppler range error and come up with a composite distance measurement.

Figure 8:
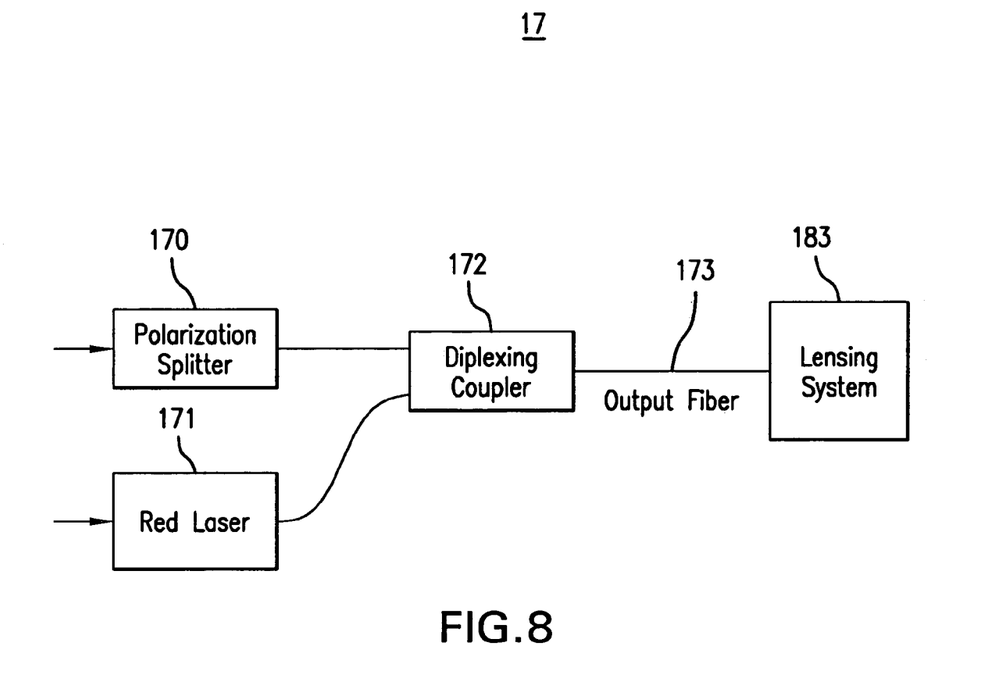
FIG. 8 shows a visible laser that may be incorporated into a geometry.

The source lasers typically used in this application are diode lasers with output wavelengths centered around 1550 nm (near IR). Since this wavelength is invisible to human vision, a second, visible laser frequency can be added to the fiber optic circuit (e.g., 17) to aid the user by providing a visible spot on the target at the same location as the IR measurement spot. As illustrated in FIG. 8, the light from a fiber pigtailed visible laser diode can be coupled into the output fiber, 173, by means of a wavelength diplexing coupler, 172. In a related aspect, diplexing coupler devices, in which the wavelength of light determines the coupling direction and ratio, include, but are not limited to, bulk optical beamsplitter devices. This coupler, 172, combines the visible light (i.e., from device 171) with the IR light from the polarization splitter, 170, into the single output fiber, 173.

Thus, what has been described is a precision detection system which uses coherent optical detection for extreme accuracy, and polarization preserving fiber to protect the source beam and the mixed return beam from adverse environmental effects. Such a system is capable of small scale integration, mass production techniques, and is very reliable in use.

While the present invention has been described according to the preferred embodiments, those of skill in this field will readily perceive a number of alternative constructions. For example, polarization splitters may be replaced by star couplers, cleaved fibers, bulk optical polarizing beamsplitters coupled to PM fibers, conventional PM couplers, and other known means for splitting and directing laser beams. In addition, the isolators may be replaced by any known means of preventing back-reflected light from disrupting the lasers' tuning characteristics. Furthermore, while a laser diode is the one embodiment of lasers as described, other known laser systems may be applicable, depending on a particular application for this device (e.g., using a fiber laser or a solid-state laser as the source).

In addition, a pinFET detector is preferred for detector means, 116, 117, 134, 135, 139, 140, 163, 164, 165, and 166. However, the detectors may comprise an avalanche photodetector (ADP), and other known means for detecting an RF signal. A pin photodetector is preferred because it can be configured as a pinFET detector or configured as a part of a transimpedence amplifier circuit.

Likewise, those of skill in this field will recognize that the various polarization manipulations in this invention may be alternatively arranged. For example, the source light beam may be horizontally or vertically polarized light. This would provide a modified scheme for the various local oscillator, reference, source, and mixed beams. All such alternative embodiments are to be included within the scope of the appended claims.

Thus, what has been described is a precise measurement system using coherent optical detection and polarization preserving fiber. While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims. The scope of the appended claims is to be accorded the broadest interpretation so as to encompass all such modifications and equivalent structures.

The invention claimed is:

1. A dual chirp laser apparatus for precision distance measurement comprising:
   a) a first coherent light beam linearly polarized in a first direction and passing through a first optical path;
   b) a second coherent light beam linearly polarized in a second direction, the second direction being orthogonal to the first direction and passing through a second optical path;
   c) a linear polarization maintaining fiber having a first transmission axis and a second transmission axis, said first transmission axis being capable of transmitting light polarized in said first direction and said second transmission axis being capable of transmitting light polarized in said second direction, said linear polarization fiber having a proximal end and a distal end;
   d) a polarization splitter capable of diplexing said first coherent light beam and said second coherent light beam and conducting said coherent light beams into the proximal end of said linear polarization maintaining fiber;
   e) an interface at the distal end of the linear polarization maintaining fiber capable of reflecting a fraction of said first coherent light beam into said first axis and of reflecting a fraction of said second coherent light beam into said second axis and further capable of transmitting both coherent light beams to a target and further capable of receiving reflected portions of both coherent light beams and transmitting them respectively into said first transmission axis and said second transmission axis, whereby a first interference signal is established in a first optical path comprising said first axis and a second interference signal is established in a second optical path comprising said second axis;
   f) a first detector capable of detecting said first interference signal and producing a first beat frequency output and a second detector capable of detecting said second interference signal and producing a second beat frequency output;
   g) digital signal processing apparatus capable of producing a first measured frequency from the first beat frequency output and capable of producing a second measured frequency from the second beat frequency output; and
   h) computing apparatus capable of computing a first relative distance measurement from the first measured frequency and a second relative distance measurement from the second measured frequency and further capable of combining said first relative distance measurement and said second relative distance measurement to produce a composite relative distance measurement, whereby uncertainty in the composite relative distance measurement is substantially reduced.

2. The dual chirp laser apparatus of claim 1 additionally comprising a calibrated reference arm, whereby an absolute distance measurement can be produced.

3. A diplex dual-chirp laser apparatus for precision relative distance measurement comprising:
   a) a first frequency-modulated laser that emits a first coherent light beam having a first emission frequency modulated by a first chirping modulation signal;
   b) a second frequency-modulated laser that emits a second coherent light beam having a second emission frequency modulated by a second chirping modulation signal, said second chirping modulation signal configured to chirp with a constant phase difference from the first chirping modulation signal;
   c) a first fiber optic coupler optically connected to the first frequency-modulated laser;
   d) a second fiber optic coupler optically connected to the second frequency-modulated laser;
   e) a linear polarization-maintaining fiber having a beam entry end and a beam exit end and comprising a first axis and a second axis, each axis being capable of independently transmitting along the fiber an independent polarized coherent light beam having a linear polarization orthogonal to the polarization of the other coherent light beam;
   f) a linear polarization splitter optically connected to the first fiber optic coupler, the second fiber optic coupler, and the beam entry end of the linear polarization-maintaining fiber, whereby the coherent light beam emitted by the first frequency-modulated laser is polarized for one linear polarization and transmitted as a first linear polarized laser light beam and the coherent light beam emitted by the second frequency-modulated laser is polarized for a second linear polarization and transmitted as a second linear polarized light beam, said first and second linear polarizations being orthogonal to one another;
   g) an interface at the beam exit end of the linear polarization-maintaining fiber, whereby a fraction of the transmitted light from each of the first coherent light beam and the second coherent light beam is reflected back toward the linear polarization splitter and thence transmitted respectively into the first fiber optic coupler and the second fiber optic coupler and whereby a complementary fraction of the transmitted light is transmitted to the target and returned to the interface from the target;

h) a first optical detector optically connected to the first fiber optic coupler;

i) whereby a first interference is established between the reflected fraction of the transmitted light from the first coherent light beam and the return of the first coherent light beam from the target and whereby the first optical detector detects a first beat frequency from the first interference;

j) a second optical detector optically connected to the second fiber optic coupler;

k) whereby a second interference is established between the reflected fraction of the transmitted light from the second coherent light beam and the return of the second coherent light beam from the target and whereby the second optical detector detects a second beat frequency from the second interference; and l) digital signal processing apparatus configured to produce beat frequency measurements and to produce a composite beat frequency.

4. The laser apparatus of claim 3 additionally comprising a first isolator optically connected between the first frequency-modulated laser and the first fiber optic coupler, whereby back-reflected light is prevented from disrupting the tuning characteristics of said first frequency-modulated laser, and a second isolator optically connected between the second frequency-modulated laser and the second fiber optic coupler, whereby back-reflected light is prevented from disrupting the tuning characteristics of said second frequency-modulated laser.

5. The laser apparatus of claim 3 additionally comprising a lensing system, whereby the first linear polarized laser light beam and the second linear polarized light beam are focused on the target, and whereby light from the first linear polarized laser light beam and light from the second linear polarized light beam that are returned from the target are focused and transmitted into the linear polarization maintaining fiber so as to be transmitted along the fiber in their respective linear polarizations, said lensing system additionally providing the interface at the beam exit end of the linear polarization-maintaining fiber.

6. The apparatus of claim 3 wherein the first chirping modulation signal and the second chirping modulation signal are configured so that the frequency modulation envelopes of the laser output waves are identical.

7. The apparatus of claim 6 wherein the first chirping modulation signal and the second chirping modulation signal are distorted sawtooth signals configured so that the frequency modulation envelopes of the laser output waves are linear sawtooth waves.

8. The apparatus of claim 3 wherein the phase difference between the two frequency modulation envelopes is 180 degrees.

9. A diplex dual-chirp laser apparatus for precision absolute distance measurement comprising:

a) A first frequency-modulated laser that emits a first coherent light beam having a first emission frequency modulated by a first chirping modulation signal;

b) A second frequency-modulated laser that emits a second coherent light beam having a second emission frequency modulated by a second chirping modulation signal, said second chirping modulation signal configured to chirp with a constant phase difference from the first chirping modulation signal;

c) a first fiber optic coupler optically connected to the first frequency-modulated laser wherein the first coherent light beam is split into two nominally 50 percent fractions;

d) a second fiber optic coupler optically connected to the second frequency-modulated laser wherein the second coherent light beam is split into two nominally 50 percent fractions;

e) a linear polarization-maintaining fiber having a beam entry end and a beam exit end and comprising a first axis and a second axis, each axis being capable of independently transmitting along the fiber an independent polarized coherent light beam having a linear polarization orthogonal to the polarization of the other coherent light beam;

f) a linear polarization splitter optically connected to the first fiber optic coupler, the second fiber optic coupler, and the beam entry end of the linear polarization-maintaining fiber, whereby the coherent light beam emitted by the first frequency-modulated laser is polarized for one linear polarization and transmitted as a first linear polarized laser light beam and the coherent light beam emitted by the second frequency-modulated laser is polarized for a second linear polarization and transmitted as a second linear polarized light beam, said first and second linear polarizations being orthogonal to one another;

g) an interface at the beam exit end of the linear polarization-maintaining fiber, whereby a fraction of the transmitted light from each of the first coherent light beam and the second coherent light beam is reflected back toward the linear polarization splitter and thence transmitted respectively into the first fiber optic coupler and the second fiber optic coupler and whereby a complementary fraction of the transmitted light is transmitted to the target and returned to the interface from the target;

h) a first optical detector optically connected to the first fiber optic coupler;

i) whereby a first interference is established between the reflected fraction of the transmitted light from the first coherent light beam and the return of the first coherent light beam from the target and whereby the first optical detector detects a first beat frequency from the first interference;

j) a second optical detector optically connected to the second fiber optic coupler;

k) whereby a second interference is established between the reflected fraction of the transmitted light from the second coherent light beam and the return of the second coherent light beam from the target and whereby the second optical detector detects a second beat frequency from the second interference;

l) digital signal processing apparatus configured to produce a first beat frequency measurement and a second beat frequency measurement;

m) a first calibrated reference arm standard optically connected to the first fiber optic coupler and receiving one of the two nominal 50 percent fractions of the first coherent light beam and further producing a first reference arm output;

n) a second calibrated reference arm standard optically connected to the second fiber optic coupler and receiving one of the two nominal 50 percent fractions of the second coherent light beam and further producing a second reference arm output; and o) computer apparatus whereby the first beat frequency measurement is combined with the first reference arm output to produce a first absolute distance measurement, whereby the second beat frequency measurement is combined with the second reference arm output to produce a second absolute distance measurement, and whereby the first absolute distance measurement is combined with the second absolute distance measurement to produce a composite absolute distance measurement, wherein uncertainty in the composite absolute distance measurement is substantially reduced.

10. The apparatus of claim 9 wherein the first calibrated reference arm standard and the second calibrated reference arm standard each comprises a fiber optic interferometer.

11. The apparatus of claim 10 wherein each fiber optic interferometer is selected from the group consisting of a Mach Zehnder interferometer and a Michelson interferometer.

12. The apparatus of claim 10 wherein each fiber optic interferometer comprises
   a) an input fiber optic coupler optically connected to the fiber optic coupler, said input fiber optic coupler capable of splitting incoming light into a two parts;
   b) two fiber optic fibers of different optical path lengths having a calibrated optical path length difference and each receiving a part of the incoming light from the input fiber optic coupler;
   c) an output fiber optic coupler, whereby the two parts of the light from the two fiber optic fibers are recombined, whereby an interference and a consequent beat frequency is established;
   d) a detector that detects the beat frequency; and
   e) digital signal processing apparatus configured to produce a beat frequency measurement for each reference arm, said beat frequency measurement for each reference arm comprising the reference arm output for the reference arm standard.

13. The laser apparatus of claim 9 additionally comprising a first isolator optically connected between the first frequency-modulated laser and the first fiber optic coupler, whereby back-reflected light is prevented from disrupting the tuning characteristics of said first frequency-modulated laser, and a second isolator optically connected between the second frequency-modulated laser and the second fiber optic coupler, whereby back-reflected light is prevented from disrupting the tuning characteristics of said second frequency-modulated laser.

14. The laser apparatus of claim 9 additionally comprising a lensing system, whereby the first linear polarized laser light beam and the second linear polarized light beam are focused on the target, and whereby light from the first linear polarized laser light beam and light from the second linear polarized light beam that are returned from the target are focused and transmitted into the linear polarization maintaining fiber so as to be transmitted along the fiber in their respective linear polarizations, said lensing system additionally providing the interface at the beam exit end of the linear polarization-maintaining fiber.

15. The laser apparatus of claim 9 wherein the first chirping modulation signal and the second chirping modulation signal are configured so that the frequency modulation envelopes of the laser output waves are identical.

16. The apparatus of claim 15 wherein the first chirping modulation signal and the second chirping modulation signal are distorted sawtooth signals configured so that the frequency modulation envelopes of the laser output waves are linear sawtooth waves.

17. The apparatus of claim 9 wherein the phase difference between the two frequency modulation envelopes is 180 degrees.

18. A method of making precision relative distance measurements comprising the steps of:
   a) generating a first chirped laser beam;
   b) generating a second chirped laser beam such that the chirping of the second beam is out of phase with the chirping of the first chirped laser beam;
   c) polarizing the first chirped laser beam into a first linear polarization;
   d) polarizing the second chirped laser beam into a second linear polarization orthogonal to the first linear polarization;
   e) combining the first polarized chirped laser beam and the second polarized chirped laser beam in a polarization splitter;
   f) transmitting the combined polarized chirped laser beams in a linear polarization-maintaining fiber to an interface at which a portion of each of the two orthogonally polarized beams is transmitted toward a target and a portion is reflected into the fiber from the interface, whereby a local oscillator is established;
   g) directing the transmitted portion of both the first chirped laser beam and the second chirped laser beam toward a target where portions of both beams are returned to the interface;
   h) receiving the returned portions of both beams at the interface and transmitting them back into the linear polarization maintaining fiber;
   i) separating the orthogonally polarized reflected beams and the orthogonally polarized return beams into a first combined beam and a second combined beam at the polarization splitter, whereby an interference is established in each of the combined beams;
   j) directing the first combined beam to a first detector and a second combined beam to a second detector;
   k) detecting a first beat frequency at the first detector and a second beat frequency at the second detector; and
   l) generating a composite beat frequency proportional to the distance of the target from the interface.

19. A method of making precision absolute distance measurements comprising the steps of:
   a) generating a first chirped laser beam;
   b) generating a second chirped laser beam such that the chirping of the second beam is out of phase with the chirping of the first chirped laser beam;
   c) polarizing the first chirped laser beam into a first linear polarization;
   d) polarizing the second chirped laser beam into a second linear polarization orthogonal to the first linear polarization;
   e) combining the first polarized chirped laser beam and the second polarized chirped laser beam in a polarization splitter;
   f) transmitting the combined polarized chirped laser beams in a linear polarization-maintaining fiber to an interface at which a portion of each of the two orthogonally polarized beams is transmitted toward a target and a portion is reflected into the fiber from the interface, whereby a local oscillator is established;
   g) directing the transmitted portion of both the first chirped laser beam and the second chirped laser beam toward a target where portions of both beams are returned to the interface;
   h) receiving the returned portions of both beams at the interface and transmitting them back into the linear polarization maintaining fiber;
   i) separating the orthogonally polarized reflected beams and the orthogonally polarized return beams into a first combined beam and a second combined beam at the polarization splitter, whereby an interference is established in each of the combined beams;

j) directing the first combined beam to a first detector and a second combined beam to a second detector;

k) detecting a first beat frequency at the first detector and a second beat frequency at the second detector;

l) generating a composite beat frequency proportional to the distance of the target from the interface;

m) sending a portion of the first polarized chirped laser beam to a first calibrated reference arm standard;

n) sending a portion of the second polarized chirped laser beam to a second calibrated reference arm standard;

o) comparing the beat frequency produced by the first detector to the beat frequency produced by the first calibrated reference arm standard to produce a first absolute measurement of the distance from the interface to the target;

p) comparing the beat frequency produced by the second detector to the beat frequency produced by the second calibrated reference arm standard to produce a second absolute measurement of the distance from the interface to the target; and q) combining the first absolute measurement of the distance from the interface to the target with the second absolute measurement of the distance from the interface to the target to produce a composite distance measurement that substantially reduces uncertainty due to motion of the target.

* * * * *